United States Patent [19]

Gruber et al.

[11] Patent Number: 5,178,446
[45] Date of Patent: Jan. 12, 1993

[54] CENTRALIZED LIGHTING SYSTEM FOR A VEHICLE HAVING A CENTRAL LIGHT SOURCE AUTOMATICALLY EXCHANGABLE IN THE EVENT OF FAILURE

[75] Inventors: Peter Gruber, Renningen; Werner-Karl Marquardt, Markgroeningen, both of Fed. Rep. of Germany

[73] Assignee: Robert Bosch GmbH, Stuttgart, Fed. Rep. of Germany

[21] Appl. No.: 791,982

[22] Filed: Nov. 14, 1991

[30] Foreign Application Priority Data

Dec. 1, 1990 [DE] Fed. Rep. of Germany ....... 4038433

[51] Int. Cl.⁵ .............................................. F21V 19/04
[52] U.S. Cl. ..................... 362/20; 362/254; 362/802
[58] Field of Search ............... 362/20, 21, 254, 802

[56] References Cited

U.S. PATENT DOCUMENTS

| Re. 31,987 | 9/1985 | Hartung et al. | 362/20 |
| 4,410,929 | 10/1983 | Feinbloom et al. | 362/20 X |
| 4,757,426 | 7/1988 | Scheller et al. | 362/20 |
| 4,855,875 | 8/1989 | Onose et al. | 362/254 X |
| 4,930,049 | 5/1990 | Davenport et al. | 362/20 |

FOREIGN PATENT DOCUMENTS 367032  5/1990  European Pat. Off.

Primary Examiner—Larry Jones
Attorney, Agent, or Firm—Michael J. Striker

[57] ABSTRACT

The lighting device has a central reflector (10), in which a first light source (11) is located in the operating position. A light guide (11) extends from the light source in the operating position and conducts light issuing directly from the light source and reflected light from the reflector (10) to vehicle light units. The first light source (11) is located in a supporting member (21) on which an additional second light source (22) is mounted. The supporting member (21) is movable relative to the reflector (10), so that on failure of the first light source located in the operating position the second light source (22) is moved in the operating position by a shifting device (26). The shifting device can have a control unit (36) and a sensor (37) connected to the control unit (36), which detects light issuing from the light source (11) in the operating position. On failure of the light source (11) the shifting device (26) is activated by the control unit (36).

16 Claims, 2 Drawing Sheets

CENTRALIZED LIGHTING SYSTEM FOR A VEHICLE HAVING A CENTRAL LIGHT SOURCE AUTOMATICALLY EXCHANGABLE IN THE EVENT OF FAILURE

BACKGROUND OF THE INVENTION

The present invention relates to a lighting device or system for a vehicle and, more particularly, to a lighting device with a single central light source and a plurality of light outlets.

A lighting device for a vehicle, especially for a motor vehicle, is known, comprising at least one light source, from which at least one light guide extends, from which the light produced by the light source issues and is conducted to light outlets in the vehicle.

This kind of lighting device is known from European Patent Application EP-A2-0 376 032. This lighting device has a central reflector and a light source. The light source has a jacket, which is provided with a reflective coating and serves simultaneously as reflector. Several light conducting members are located in the circumference of the reflector so the reflector is permeable to light in these regions. Light guides, which lead to different vehicle light units and which conduct light from the light source to the vehicle light units, are connected to the light conducting members. Only one light source is provided in the central reflector of the lighting device, so that, when this single light source fails, the vehicle light units are no longer provided with light and thus a dangerous traffic situation could arise.

SUMMARY OF THE INVENTION

It is an object of the present invention to provide a safer lighting device of the above described type, which does not have the above-mentioned disadvantages.

This object, and others which will be made more apparent hereinafter, are attained in a lighting device for a vehicle comprising at least one light source operable to produce light and at least one light guide extending from the at least one light source, the light from the light source entering the light guide and being conducted to at least one light outlet, preferably in a vehicle light unit.

According to the invention, a shifting means and a plurality of the light sources are provided. One of the light sources is located in an operating position and the light sources are movable by the shifting means, so that, on failure of the light source in the operating position, the light source in the operating position is moved out of the operating position and another light source is moved into the operating position.

The lighting device has been made fail-safe, since when the light source in the operating position fails, it is replaced by one of the other light sources.

By providing a supporting member on which the light sources are mounted, the light sources can be easily and quickly shifted so that a light source in an operating position is replaced by one of the other light sources. The source of energy for moving the supporting member can be a precompressed spring.

In one embodiment according to the invention the shifting means has a control unit and a sensor detecting the light issuing from the light source in the operating position, so that, on failure of the light source the shifting means for shifting the light sources, is activated by the control unit. Also the shifting means can advantageously have a control unit and a sensor measuring a current received by the light source in the operating position on switching on the lighting device, so that the shifting means is activated to shift the light sources by the control unit, when the current received by the light source in the operating position, is less than that required for a correct operation of the light source in the operating position.

A signaling device can be provided announcing the failure of the light source at the operating position to the driver, so an exchange of the light sources can be made or so that subsequently several light sources can be used in series. Contacting elements and electrical connecting lines are provided for the light source.

Means for electrically disconnecting the control unit from the contacting elements during the shifting of the light sources can be provided so that the dangers resulting from the high voltage required for operation of the gas discharge lamp can be avoided.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
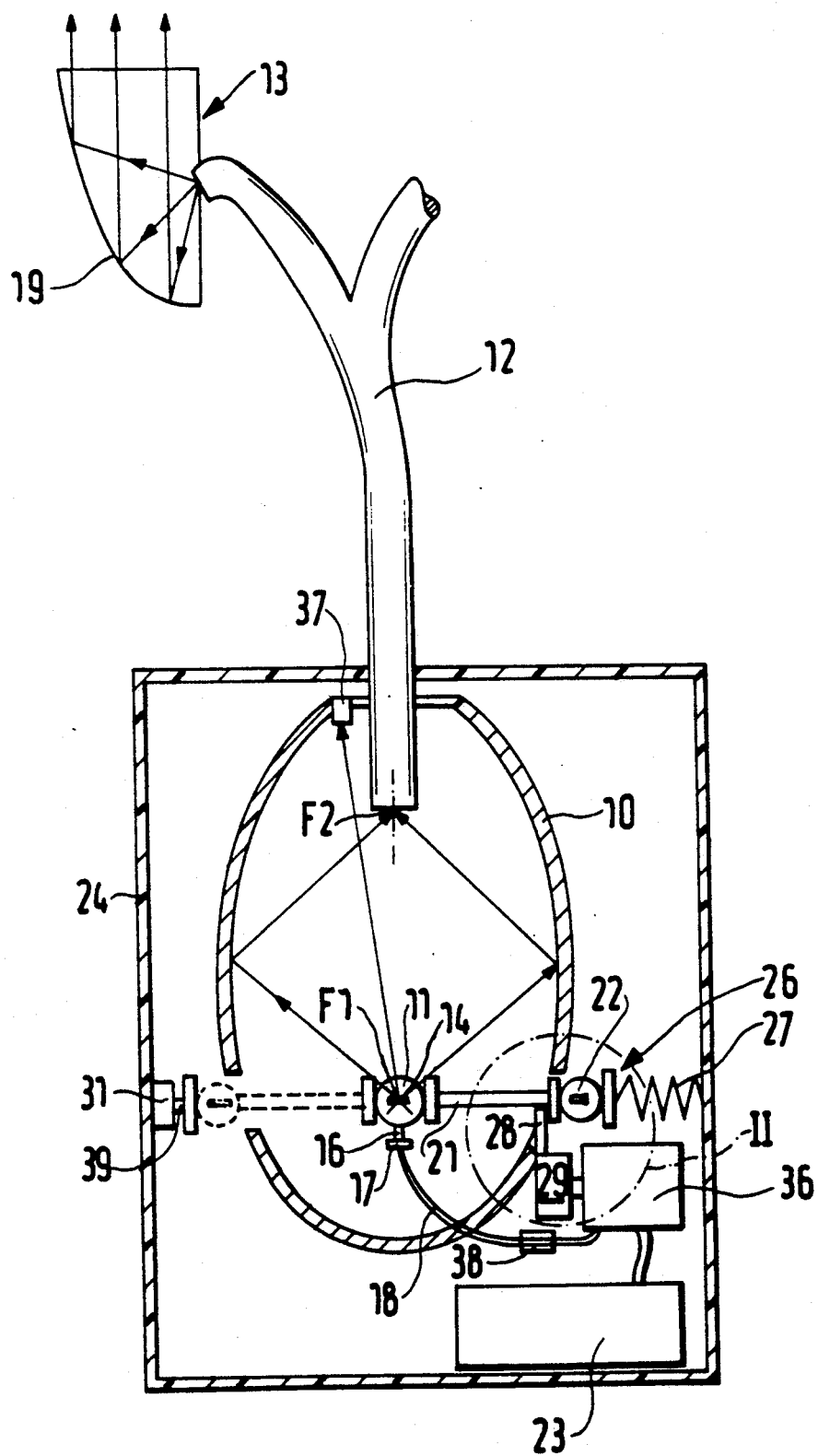
FIG. 1 is a schematic cross-sectional view through a lighting device according to the invention.

In FIG. 1 one embodiment of a lighting device for a vehicle, especially a motor vehicle, according to the invention is shown. The lighting device has a central reflector 10, in which a first light source 11 is located. At least one light guide 12 extends from the reflector 10. The light originating from the light source 11 and reflected from the reflector 10 arriving at the light guide 12 is conducted to various light outlets in the vehicle, for example vehicle light units 13, of which only one is shown. By "vehicle light units" we mean, for example, headlights, blinking signal lights, brake lights and instrument lights. The ends projecting into the vehicle light units become sources of light in these units, so that the vehicle light units can be correspondingly easily assembled and constructed in a space-saving manner.

In another simplified embodiment of my lighting device the reflector can be abandoned. Only the light issuing from the light source 11 directly to the light guides then reaches the light units 13.

The central reflector 10 is formed by a rotating ellipsoid with a first focal point F1 and a second focal point F2. The first light source 11 is located in an operating position, in which its filament or light generating element 14 is located at least approximately at the first focal point F1 of the reflector 10. In this operating position the electrical connecting element 16 contacts the light source 11 on contacting element 17 located fixed in the reflector 10. These contacting elements 17 are, for their part, connected by electrical conductors 18 with the power supply of the motor vehicle as current source. One of the ends of the light guide 12 is located at the second focal point F2 of the reflector 10 with its front face directed toward the first focal point F1. The light issuing from the light source is reflected from the reflector 10 to this second focal point F2 and issues there into the light guide 12, which conducts the light to the vehicle light unit 13. The vehicle light unit 13 has, for example, a reflector 19 for collection and radiation of light issuing from the light guide.

The first light source 11 is held on a supporting member 21, on which a second light source 22 is also mounted. Both light sources 11, 22 could be constructed as a gas discharge lamp. The contacting elements 17 are then connected with a circuit means 23 to provide the required high voltage for operation of the gas discharge lamp. The supporting member 21 is thus guided, so that it is movable relative to the reflector 10, advantageously transversely to the principal axis of the reflector through suitable openings in the reflector wall. The reflector 10 is located in a housing 24. When the first light source 11 located in the operating position fails, since the supporting member 21 is thus movable, the second light source 22 can be and is moved into the operating position. A displacement of the supporting member 21 is caused by a shifting means 26, which in this embodiment is supported on one side of the housing 24 and has a compressed spring 27 acting as energy source acting on supporting member 21. In the initial position of the supporting member 21, in which the first light source 11 is in the operating position, the compressed spring 27 is under compression and the supporting member is held in place by a movable retaining element 28. The retaining element 28 is movable into a second position shown with dashed lines in FIG. 1, in which the retaining element 28 releases the supporting member 21, from a first position, in which the supporting member 21 contacts the retaining element 28 and the first light 11 source is 11 fixed in its operating position. After its release, the supporting member 21 is pushed by the compressed spring 27 until it comes into contact with a stop or second retaining element 31 mounted on the housing 24 in a position shown with dashed lines after a certain displacement. The displacement is of such a size that the second light source 22 is located in its operating position when the supporting member 21 contacts the stop 31 and is connected with the contacting elements 17.

Figure 2:
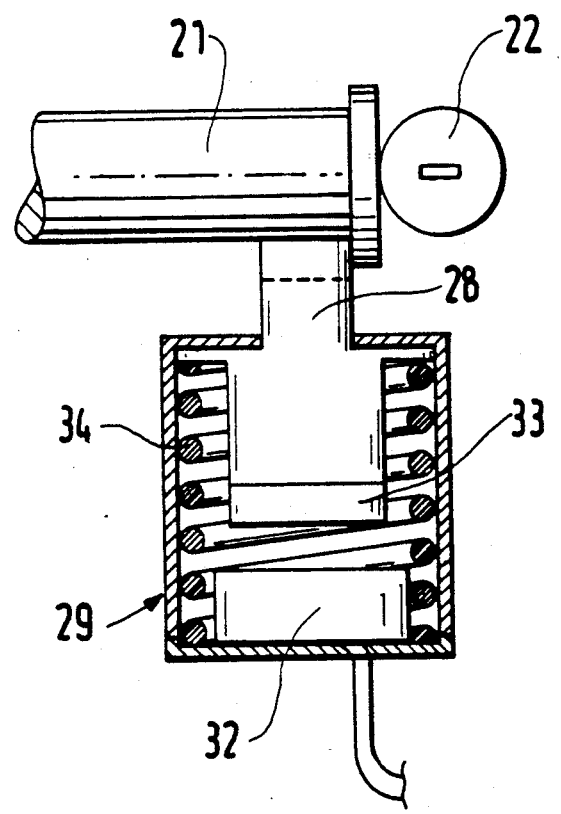
FIG. 2 is a detailed cutaway partially cross-sectional view of a portion of the device shown in FIG. 2 in the dot-dashed circle II.

An activating means 29 for moving the retaining element 28 can, as shown in FIG. 2, be an electromagnetic device with a stationary magnetic coil 32 and a core portion 33 connected with the retaining element 28 made from magnetic material, for example soft iron. The retaining element 28 is held by a spring 34 in its first position and during current flow through the magnetic coil is drawn against the force of spring 34 into its second position. In the operating lighting device on failure of the first light source 11 located in the operating position the retaining element 28 can be pulled back from its position holding the supporting member 21 fixed, so that the supporting member 21 is moved by the spring and the second light source 22 is operated.

In one embodiment of the lighting device a control unit 36 can be provided, which has a sensor 37, e.g. in the form of a photocell, which detects the light issuing from the light source 11 located in the operating position. On failure of the first light source 11 located in the operating position no light from that light source impinges on from the sensor 37, so that then the activating means 29 for the retaining element 28 is operated by a circuit provided in the control unit 36. An automatic detection of the failure of the first light source 11 and the activation of the second light source 22 is attained in this form of the lighting device. For safety reasons it is however significant to signal the driver of the vehicle of the failure of the first light source. As a signal device an indicator light can be provided in the armature, which is turned on by the control unit 36 like the activating means 29 for the retaining element 28.

In another embodiment, the control unit 36 has a sensor 38, which detects the current received from the light source 11 instead of the light issuing from the light source. If with the lighting device turned on it is established by the sensor 38 that there is no current flow or the current flow is too weak to operate the light source, then as described previously the control unit 36 operates the activating device 29 for the retaining element 28 by a suitable circuit.

In another form of the lighting device according to the invention the control unit 36 can be formed so that the contacting elements 17 are separated from the power supply circuit and/or circuit means 23 on or prior to activation of the retaining element 28 for the duration of the displacement of the supporting member 21, so that separation of the electrical connection 16 of the first light source 11 from the contact elements 17 and/or making contact of the second light source 22 with the contacting elements 17 does not lead to spark formation or other dangerous events in connection with the high voltage required for operation of the gas discharge lamp. The separation of the contacting elements 17 can be activated by the sensors 36 and 38. For detection of the end of the motion of the supporting member 21 a switch 39 is provided on the stop 31. The switch 39 is activated by supporting member 21 in its end position and after that the contacting elements 17 again are connected but with the second light source 22.

For further improvement of the fail-safe operation of the lighting device additional light sources can be positioned on the supporting member 21. Furthermore several retaining elements can also be provided. On failure of the first light source the supporting member is released by the first retaining element so that a second light source arrives at the focal point. However then the second light source is also provided wit ha second retaining element, which can be activated so that a third light source replaces the second light source if it fails, and so on.

The supporting member carrying the light sources can also be mounted rotatable in the reflector in variation from the previously described embodiments. Then the energy source for the motion of the supporting member can be a spiral spring.

While the invention has been illustrated and described as embodied in a lighting device for a vehicle, particularly a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a lighting device for a vehicle, especially a motor vehicle, comprising at least one light source operable to produce light and at least one light guide extending from the at least one light source the light from the light source entering the light guide and being conducted to at least one light outlet, the improvement comprising a shifting means (26) having a control unit (36) and a sensor (37) connected to the control unit for observing one of the light sources in operation, and wherein a plurality of the light sources are provided, one of the light sources being located in an operating position and the light sources (11,22) being movable by the shifting means so as to be moved when the control unit (36) of the shifting means is activated in response to the sensor (37), so that, on failure of the light source (11) located in the operating position, the light source (11) located in the operating position is moved out of the operating position and another (22) of the light sources is moved into the operating position previously occupied by the light source (11) which has failed.

2. The improvement as defined in claim 1, further comprising a supporting member (21) on which the light sources (11,22) are mounted, and wherein the supporting member (21) is movable by the shifting means (26).

3. The improvement as defined in claim 2, wherein the shifting means (26) comprises an energy source (27); a movable retaining element (28), the movable retaining element (28) being positionable in a first position so as to hold the supporting member (21) against the action of the energy source and being moveable from the first position into a second position so that the supporting member (21) is movable by the energy source (27); and a second retaining element (31) on which the supporting member (21) contacts when the movable retaining element is in the second position.

4. The improvement as defined in claim 3, wherein the energy source (27) is a precompressed spring.

5. The improvement as defined in claim 3, further comprising an electromagnetic activating device (29) connected to the control unit and to the movable retaining element for moving the retaining element (28) from the first position to the second position when the activating device is activated by the control unit in response to the sensor.

6. The improvement as defined in claim 1, wherein the sensor (37) is structured for detecting the light issuing from the light source in the operating position, so that, on failure of the light source in the operating position, the shifting means (26) for shifting the light source is activated by the control unit (36).

7. The improvement as defined in claim 1, wherein the sensor (38) is structured for measuring a current received by the light source in the operating position on switching on the lighting device, so that the shifting means is activated to shift the light sources by control unit (36), when the current received by the light source in the operating position, is less than that required for a correct operation of the light source (11) in the operating position.

8. The improvement as defined in claim 1, further comprising a signaling device positioned so as to be noticeable by a driver of the vehicle and structured so as to provide a signal when the light source in the operating position fails.

9. The improvement as defined in claim 1, further comprising a current source (23) and fixed contacting elements (17), by which the light source (1) located in the operating position is connectable with the current source (23).

10. The improvement as defined in claim 1, further comprising means for electrically disconnecting the control unit (36) from the contacting elements (17) when the shifting means is activated to shift the light sources.

11. The improvement as defined in claim 1, further comprising means for electrically disconnecting the control unit (36) from the contacting elements (17) when the shifting means is activated to shift the light sources.

12. The improvement as defined in claim 1, further comprising a reflector (10) cooperating with the light source (11) in the operating position, said reflector being positioned to direct the light from the light source in the operating position into the light guide.

13. A lighting device for a vehicle comprising:
a plurality of light sources mounted on a movable supporting member so that at least two of the light sources are each separately locatable in an operating position by moving the supporting member;
at least one light guide positioned to conduct light from the light source located in the operating position; and
a shifting means connected to the supporting member for moving the supporting member, said shifting means having a control unit and a sensor connected with the control unit for observing the light source in the operating position, wherein the supporting member with the light sources is movable by the shifting means so as to be moved when the shifting means is activated by the control unit in response to the sensor, so that, on failure of the light source located in the operating position, the failed light source located in the operating position is moved out of the operating position and another light source is moved into the operating position previously occupied by the failed light source.

14. A lighting device as defined in claim 13, wherein the shifting means comprises a precompressed spring acting on the supporting member; a movable retaining element engagable with the supporting member, the movable retaining element being positionable in a first position in which the supporting member is held against the action of the precompressed spring, and the movable retaining element being movable by the precompressed spring from the first position into a second position; a second retaining element on which the supporting member rests when said movable retaining element is in the second position; and an electromagnetic activating device connected to the control unit and the movable retaining element, the movable retaining element being movable from the first position to the second position by the electromagnetic activating device when activated and the control unit activating the electromagnetic activating device in response to the sensor.

15. A lighting device as defined in claim 14, wherein the sensor and the control unit are structured to detect the light issuing from the light source in the operating position, so that, on failure of the light source in the operating position to generate the light, the shifting means for shifting the light source is activated by the control unit in response to the sensor.

16. A lighting device as defined in claim 14, wherein the sensor and the control unit are structured to measure a current received by the light source in the operating position when the lighting device is turned on so that the shifting means is activated to shift the light sources when the current received by the light source in the operating position is less than that required for a correct operation of the light source in the operating position.

* * * * *